(12) United States Patent
Marti Sendra et al.

(10) Patent No.: US 7,894,049 B2
(45) Date of Patent: Feb. 22, 2011

(54) METHOD AND DEVICE FOR MEASURING POLARIZATION STATE AND POLARIZATION MODE DISPERSION IN PHOTONIC TRANSMISSION SYSTEMS

(75) Inventors: Javier Marti Sendra, Valencia (ES); Roberto Llorente Saez, Valencia (ES)

(73) Assignee: Universidad Politecnica De Valencia, Valencia (ES)

( * ) Notice: Subject to any disclaimer, the term of this patent is extended or adjusted under 35 U.S.C. 154(b) by 379 days.

(21) Appl. No.: 11/817,558

(22) PCT Filed: Mar. 3, 2006

(86) PCT No.: PCT/ES2006/000099

§ 371 (c)(1),
(2), (4) Date: May 12, 2008

(87) PCT Pub. No.: WO2006/095036

PCT Pub. Date: Sep. 14, 2006

(65) Prior Publication Data

US 2009/0109437 A1    Apr. 30, 2009

(30) Foreign Application Priority Data

Mar. 5, 2005    (ES) ............................. P 200500512

(51) Int. Cl.
G01N 21/00 (2006.01)
G01J 4/00 (2006.01)
(52) U.S. Cl. ...................... 356/73.1; 356/364
(58) Field of Classification Search ............ None
See application file for complete search history.

(56) References Cited

U.S. PATENT DOCUMENTS 6,011,253 A * 1/2000 Hakki ...................... 250/225

(Continued)

FOREIGN PATENT DOCUMENTS

EP    1494373    1/2005

(Continued)

OTHER PUBLICATIONS

Llorente et al.,"Performance Analysis of Polarimetric PMD Monitoring by Real-Time Optical Fourier Transformers," IEEE Photonics Technology Letters, vol. 18, No. 12, pp. 1383-1385, Jun. 15, 2006.*

(Continued)

*Primary Examiner* — Tarifur Chowdhury
*Assistant Examiner* — Gordon J Stock, Jr.
(74) *Attorney, Agent, or Firm* — Katten Muchin Rosenman LLP

(57) ABSTRACT

A method and device capable of evaluating the specific values of the polarization state of the signal transmitted in a photonic transmission system for a number of frequencies of one or more of the pulses extracted from the optical signal by means of the translation of the frequential components of polarization state of one or more pulses to the time domain by means of the use of an optical Fourier transformer, and their sampling, quantification and subsequent analysis.

From the analysis the variation in the polarization state versus frequency is calculated, as well as its associate PMD vector and the DGD present in the signal transmitted. This information may be used as a control signal for a PMD compensator device in order to upgrade the quality of communication in the system.

12 Claims, 4 Drawing Sheets

U.S. PATENT DOCUMENTS

| | | | |
|---|---|---|---|
| 6,765,670 B2 * | 7/2004 | Olsson et al. | 356/327 |
| 7,227,645 B2 * | 6/2007 | Cyr | 356/491 |
| 7,672,593 B2 * | 3/2010 | Hirooka et al. | 398/98 |
| 2004/0008991 A1 | 1/2004 | Waarts et al. | |
| 2004/0071381 A1 | 4/2004 | Szafraniec et al. | |
| 2004/0151416 A1 | 8/2004 | Galtarossa et al. | |
| 2006/0232847 A1 * | 10/2006 | Hirooka et al. | 359/237 |

FOREIGN PATENT DOCUMENTS

JP  20040138615  5/2004

OTHER PUBLICATIONS

Llorente et al., "PMD Monitoring by Spectral SOP Rotation Using a Real-Time Optical Fourier Transformer," 3 pages, Optical Society of America, 2004.*

* cited by examiner

METHOD AND DEVICE FOR MEASURING POLARIZATION STATE AND POLARIZATION MODE DISPERSION IN PHOTONIC TRANSMISSION SYSTEMS

OBJECT OF THE INVENTION

The present invention refers to a method and device for monitoring the polarization state of pulses extracted from an optical signal in a photonic transmission system and using this as the basis for calculating the value of the differential group delay.

BACKGROUND OF THE INVENTION

We are already familiar with a variety of devices capable of carrying out the monitoring of polarization mode dispersion, PMD, in photonic transmission systems. In a number of patent applications different techniques are described for the measuring and monitoring of PMD in systems of this type. These known techniques, however, may prove inadequate or, at least, open to improvement, insofar as spectral resolution and measuring speed are concerned, which may be crucial in the field of application of the present invention.

Patent application publ. no. US-A-2004/008991 describes a method for measuring PMD by means of heterodyne detection (modulus and phase) of the signal produced by the optical mixing of the signal present in a photonic transmission system with an optical carrier generated by a continuous wave laser, which has a variable oscillation frequency. In this way, by scanning the whole spectrum of the signal, it is possible to calculate the value of the system PMD. However, the scan performed by the laser is a complex inherently slow process. PMD is a random process which may have a highly variable dynamic, which means that it may be important to increase the monitoring speed. The polarization state and PMD are evaluated on the basis of amplitude and frequency detected by heterodyne means, which is a method intrinsically different from the one considered in the present patent. The system described in US-A-2004/008991 requires a mixing process, a continuous wave laser and a heterodyne detection mechanism, which entails a fairly complex system.

Patent application publ. No. JP-A-2004-138615 also describes a system for measuring PMD in a photonic link, by means of the coherent analysis (including measuring the amplitude and phase) of the spectrum of a specific signal divided into bands, transmitted by way of said link. The method proposed, however, is based on specific signals, which prevents the link from being in operation at the same time and requires a heterodyne polarimeter, which makes a sweep in frequency with a local oscillator variable for each band. This method suffers from the same limitations as the application described in the previous paragraph with regard to complexity and speed of operation.

Furthermore, patent application publ. no. US-A-2004/151416 describes a method for measuring PMD based on the division into sub-bands of the frequency range encompassed by the signal transmitted by the photonic transmission system. A reference signal is calculated on each one of these bands. On this reference signal a mix is done with a signal from a laser source. The value of the PMD of the original system signal is calculated by collating the information from all the sub-bands. This method is substantially complex and limits spectral resolution to the number of sub-bands implemented in the device.

Furthermore, patent application publ. no. EP-A-1494373 describes a PMD analyser based on the distortion of the optical signal transmitted. This distortion is evaluated on the basis of the direct (DC) and alternating components (AC) of the signal, which indicate the distortion introduced by PMD. This approach requires a set of filters located precisely at certain frequencies, its configuration being dependent on the system signalling rate.

We have considered that it would be beneficial to establish a method and device which resolves, at least partly, some of the problems or drawbacks presented by the known systems.

DESCRIPTION OF THE INVENTION

The present invention consists of a method and device capable of monitoring the polarization state, SOP, defined by its four vectorial components ($S0$, $S1$, $S2$ and $S3$) in the Poincaré sphere, on the basis of optical pulses extracted from an optical signal in a photonic transmission system, which carries information (analogue or digital) modulated on these optical pulses, in some of its parameters (amplitude, phase, frequency, time position or envelope amongst others). The method described evaluates the specific values of the SOP for a number of frequencies (frequential components of SOP) of the optical pulses and on the basis of their variation it is able to calculate the value of the differential group delay (DGD) that the optical signal has undergone during its transmission by effect of polarization mode dispersion, PMD. In a more particular way, the invention consists of a method and device capable of evaluating the frequential components of the SOP of the pulses extracted from the optical signal by means of a sub-system capable of rotating the polarization of the input signal to the device in at least four different angles in the Poincaré sphere, subsequent projection of these rotated polarizations on a polarizing device oriented at a fixed angle of the Poincaré sphere, and lastly performing a conversion of the frequential components into the time domain by means of an optical Fourier transformer, OFT. In this way, the projection of the pulses extracted from the optical input signal on four vectors of the Poincaré sphere forming a coordinate axis is calculated. The rotation of the polarization of these pulses may be carried out, without loss of generality, either by means of division into four optical paths and rotation in each of them (parallel architecture) or else by means of successive pulses whether consecutive or not (serial architecture).

The method and system of measuring is supplemented with the translation of the optical signal frequential components into the time domain and their sampling and subsequent quantification. The translation of the optical signal frequential components into the time domain is done by means of an optical Fourier transformer element or device capable of carrying out the direct Fourier transform (time domain to frequential components) or vice versa (frequential components to time domain.

In this way, the optical signals produced at the output of the optical Fourier transformer, OFT, device are transformed into an electrical signal by means of a photodetector device and time sampled with a analogue-digital converter sub-system so as to be processed digitally. Sampling in the time domain offers the inherent advantage of the commercial availability of devices capable of sampling at very high speeds, which means availability for processing of a large number of frequential samples coming from a single optical pulse.

This OFT device in our field of application presents the feature of providing an optical signal at its output port whose envelope is proportional to the modulus of the frequential components (spectrum) of the optical signal present at its input port. This device may be executed in numerous ways, one of them consisting, without loss of generality, in the propagation of the optical signal by a means that presents a significant chromatic dispersion value, as may be a section of optical fiber or a diffraction network, amongst others.

In short, the method described, which comprises the rotations of polarization, projection with the polarizing device, transformation from the frequential domain to the time domain, photodetection and sampling, is able to calculate the variation of the SOP frequential components from the pulses extracted from the optical signal and to calculate the DGD present in it on the basis solely of the information provided by one or more optical pulses. This offers considerable advantages.

The present invention has its application in the field of quality of communication in photonic transmission systems, and more specifically in the PMD monitoring and compensation sub-systems.

BRIEF DESCRIPTION OF THE DRAWINGS

These and other features and advantages of the invention will be explained more clearly on the basis of the detailed description given below of a preferred form of embodiment, offered merely by way of an illustrative and non-restrictive example, with reference to the drawings attached, in which.

DESCRIPTION OF THE PREFERRED EMBODIMENT

Figure 1:
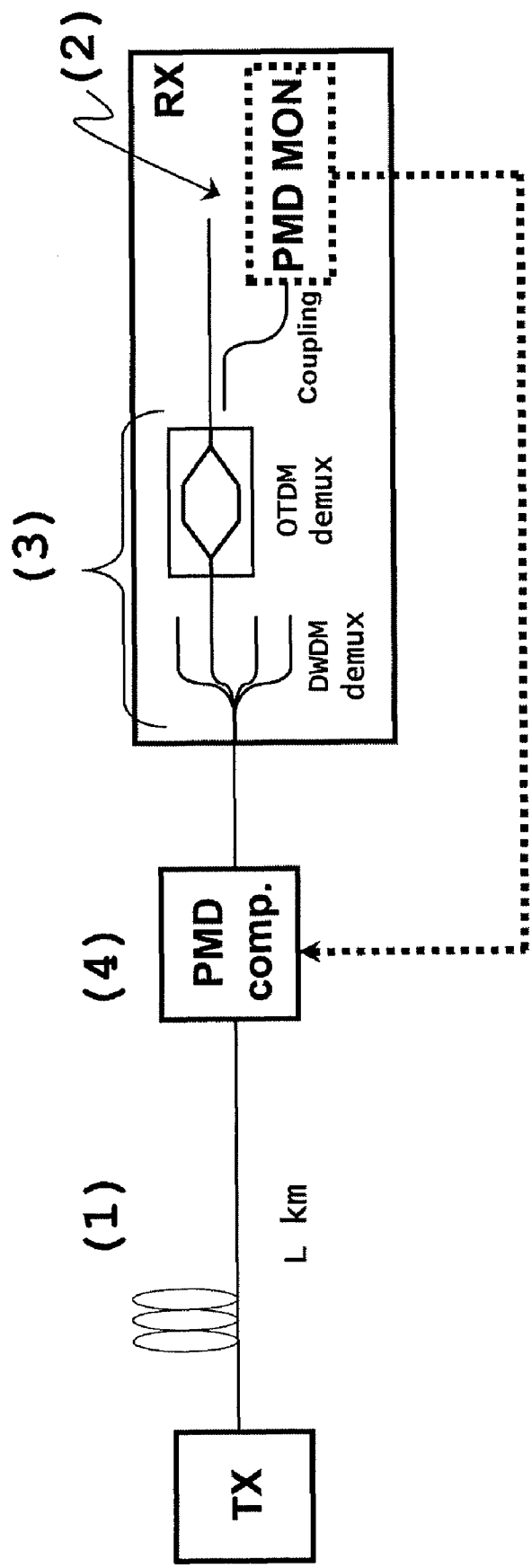
FIG. 1 shows the sphere of application of the method and device for measuring the polarization state. This diagram shows a photonic transmission system in which the SOP is measured and the PMD is evaluated by means of estimating the DGD undergone by the signal.

To carry out the following detailed description of the preferred embodiment of the present invention, permanent reference will be made to the Figures of the drawings by way of which the same numerical references have been used for the same or similar parts. Thus, making reference, first of all, to FIG. 1, the diagram shows the field of application of the device for measuring the polarization state and mode dispersion. This field of application corresponds to a photonic transmission system (1) in which, either at reception or else at intermediate stages of the system, the PMD is measured by way of estimating its DGD at the PMD monitor block (2). The transmission system PMD may be measured both on the optical pulses travelling through the system and on the optical pulses stemming from an optical sampling of the time de-multiplexing, if present in the system, and on the optical pulses resulting from frequency de-multiplexing, if present in the system, (3) without loss of generality. This signal measured may be used as a PMD compensator block (4) input capable of compensating the DGD measured in order to upgrade the quality of communication in the photonic transmission system.

Figure 2:
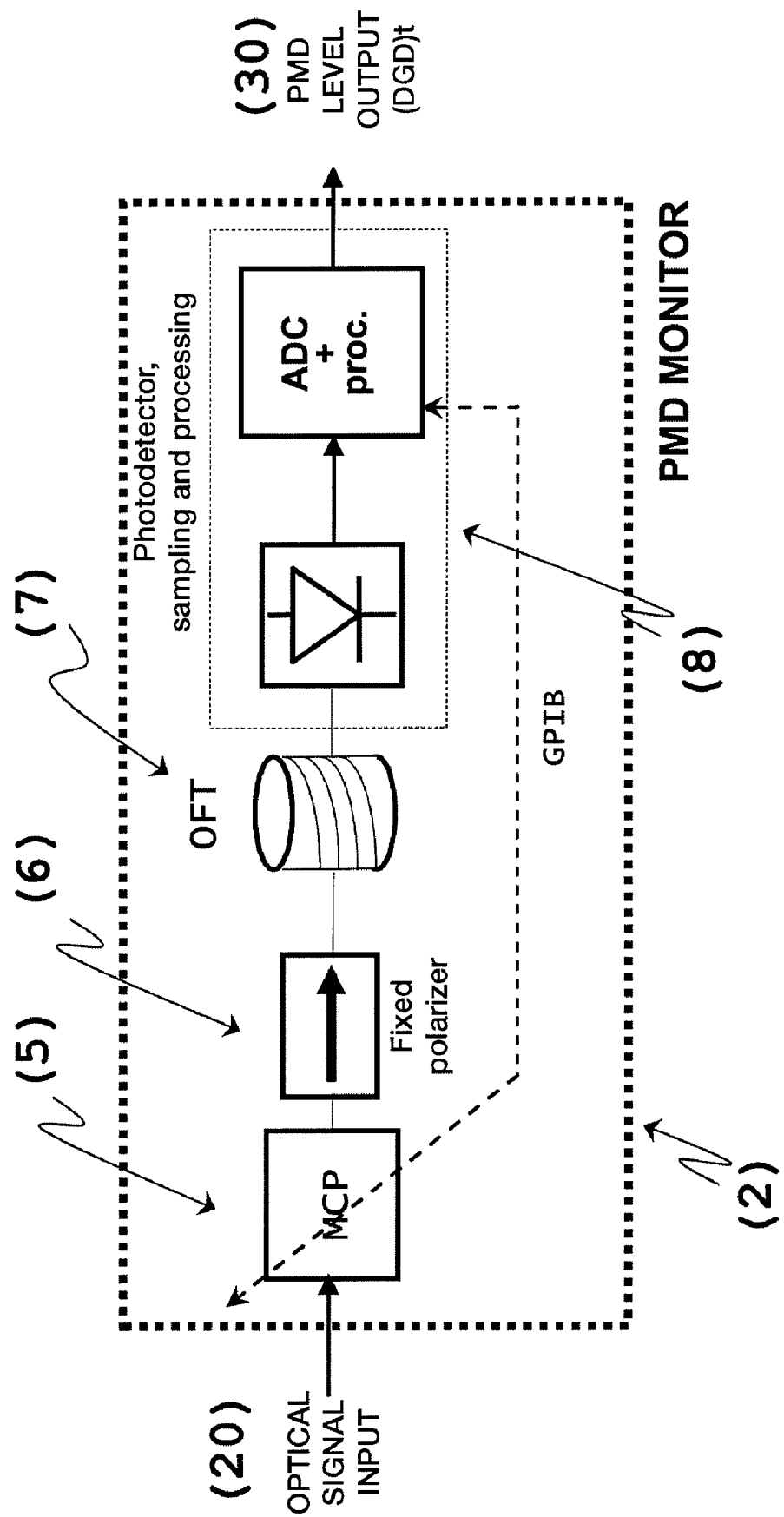
FIG. 2 shows a specimen serial implementation of the PMD monitoring system.

FIG. 2 shows a specimen embodiment of the device for measuring the polarization state and mode dispersion by means of the serial implementation of the rotations needed in the polarization of the signal to be measured. In this embodiment we start off from the system optical signal (20), which is fed into an automated polarization controller sub-system (5), which, by means of a series of commands, changes sequentially the rotation introduced into the polarization for each pulse of the optical signal. The different signals obtained after each rotation are projected onto a fixed polarizer (6) and subsequently their frequential content is translated to the time domain by means of the optical Fourier transformer (7) (OFT). Finally, the signals corresponding to the different rotations and projection are photodetected and sampled by means of an analogue-digital converter (8) so as to be processed digitally as a whole in order to evaluate the variation in the frequency-dependent polarization state on the Poincaré sphere and provide the system DGD value (30).

Figure 3:
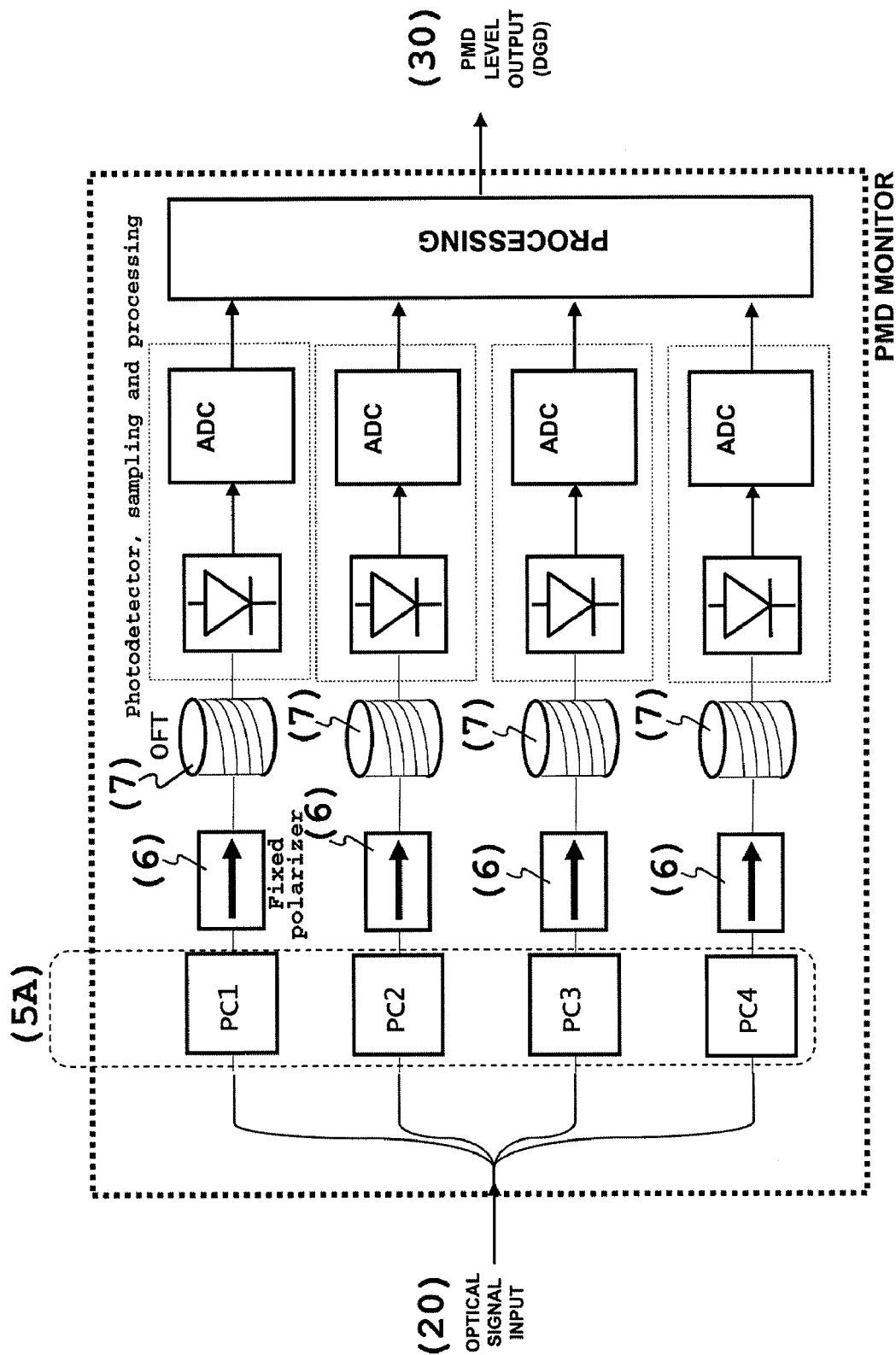
FIG. 3 shows an example of parallel implementation of the PMD monitoring system.

FIG. 3 shows a specimen embodiment of the device for measuring the polarization state and the mode dispersion by means of the parallel implementation of the rotations needed in the polarization of the signal to be measured. This embodiment starts off from the system optical signal (20), which is divided into four different optical paths and fed into a subsystem which rotates the polarization a different fixed quantity for each path (5A). On each path the same operations described in the previous embodiment are performed so that the traces obtained after each rotation are projected on a fixed polarizer (6) and then their frequential content is translated into the time domain by means of an optical Fourier transformer (7) (OFT. Finally, the different traces corresponding to each optical path are photodetected, sampled and processed as a whole in order to obtain the variation in the frequency-dependent polarization state on the Poincaré sphere and provide the system DGD value (30).

Figure 4:
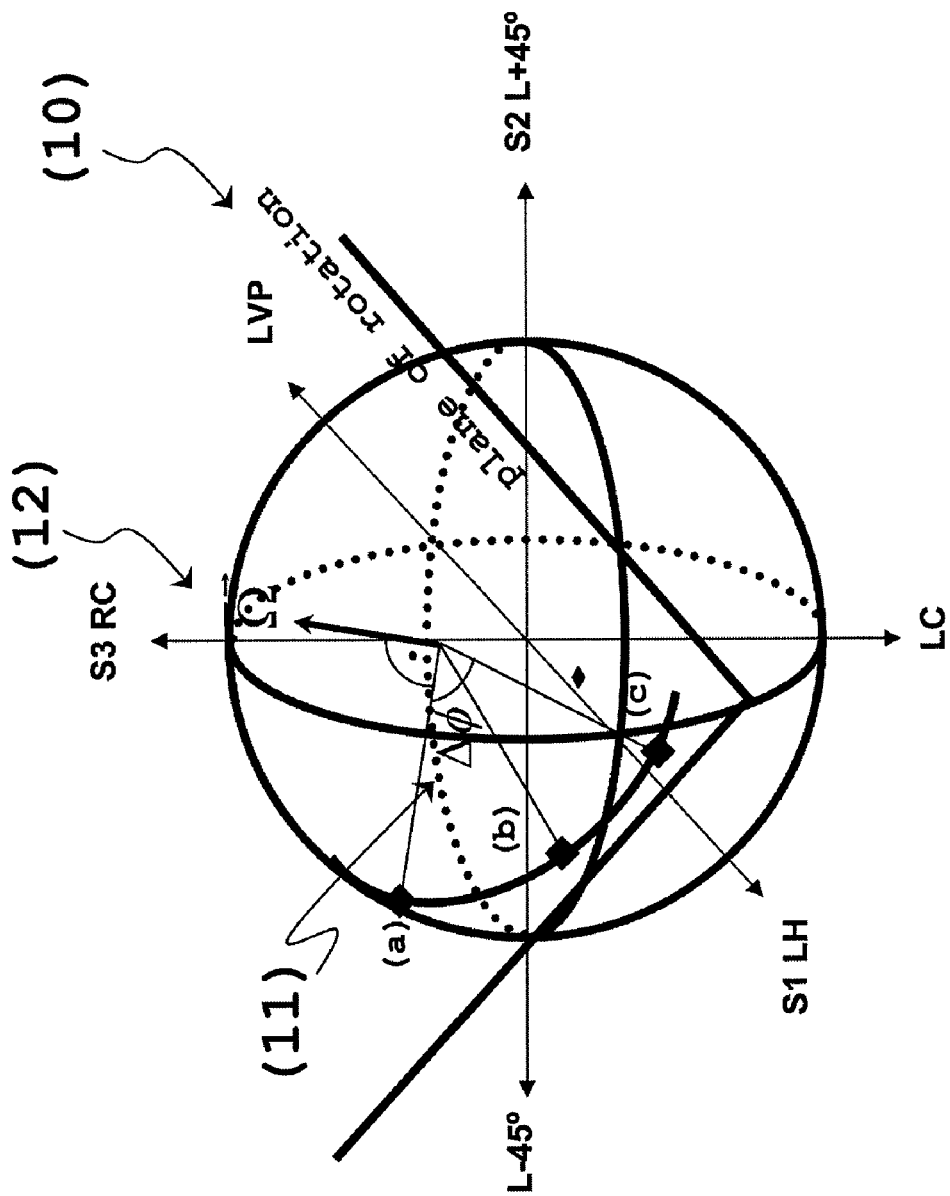
FIG. 4 shows an example of evaluation of the DGD as a function of the variation of the polarization state of the signal monitored.

Both in the serial embodiment described and in the parallel embodiment described, the variation in the frequency-dependent polarization state on the Poincaré sphere is calculated. FIG. 4 shows an example of estimation of the DGD value, which may be applied, without prejudice to the use of other methods. In this method, any three values of the polarization state are considered for three given frequencies, (a) (b) and (c), from amongst the whole set of samples photodetected and sampled. Using these samples, the plane defined by them (10) is calculated, and the angle (11) on that plane that encompasses them. Knowing this angle and the frequencies to which each sample corresponds, it is possible to find out the frequential variation in the polarization state and the PMD vector that is perpendicular to that plane (12), whose modulus supplies us with the DGD value.

It is not considered necessary to make the content of this description more extensive for an expert on the matter to be able to appreciate its scope and the advantages stemming from the invention, as well as to develop and put into practice the object of same.

Nonetheless, it should be understood that the invention has been described according to a preferred embodiment of same, so it may be amenable to modifications without this involving any alteration of its fundamentals, as defined in the adjoining claims.

What is claimed is:

1. A method for measuring a polarization state and polarization mode dispersion applicable to a photonic transmission system, the method comprising the steps of:

(a) extracting optical pulses from a signal transmitted by the photonic transmission system;

(b) projecting the optical pulses onto a coordinate axis in a Poincaré sphere by means of a series of rotations of polarization and then projecting the optical pulses on a fixed polarization in order to lean the polarization state of the optical pulses;

(c) translating spectral information of said polarization state to a time domain by means of an optical Fourier transformer; and (d) performing a sampling of the spectral information translated to the time domain.

2. The method in accordance with claim 1, further comprising, the step of calculating different planes formed by sets of at least three samples in order to evaluate a rate of spectral variation of the polarization state.

3. The method in accordance with claim 1, wherein the series of rotations of polarization are performed by means of a division of the optical signal into four optical paths and by means of a rotation of the polarization in each of the four optical paths.

4. The method in accordance with claim 1, wherein the rotations of polarization are performed by means of successive rotation of pulses.

5. The method of claim 1, wherein sampling of the spectral information translated to the time domain comprises the steps of:

translating the optical signals at the output of the optical Fourier transformer to an analogue electrical signal;

converting said analogue signal into a digital signal; and processing said digital signal by digital means.

6. The method of claim 1, wherein the series rotations of polarization are performed at four different angles at least in the Poincaré sphere.

7. A device that measures a polarization state and polarization mode dispersion applicable to a photonic transmission system, the device comprising:

an input for an optical signal, the optical signal composed of pulses extracted from a signal transmitted by the photonic transmission system;

a subsystem configured to rotate a polarization state of the optical signal at four angles at least of a Poincaré sphere and to then project the polarization on a fixed polarization vector by means of a polarizing device oriented at a fixed angle on the Poincaré sphere; and an optical Fourier transformer translating frequency components of optical signals to a time domain, said optical Fourier transformer device receiving an optical signal that comes from the polarizing device.

8. The device of claim 7, wherein the device comprises a serial architecture, the serial architecture being rotated by means of successive pulse rotation.

9. The device of claim 7, wherein the device comprises a parallel architecture, comprising at least four optical paths, each optical path comprising a subsystem rotating the polarization of the input signal and then projecting the polarization onto a fixed polarization vector by means of a polarizing device.

10. The device according to claim 7, further comprising a photodetector situated to receive optical signals from the optical Fourier transformer and to convert the optical signals into analogue electrical signals.

11. The device according to claim 10, further comprising an analogue-digital converter for sampling said analogue signals and converting the analogue signals into digital signals.

12. The device according to claim 11, further comprising means for digital processing of the digital signals.

* * * * *